United States Patent [19]

Arnold

[11] Patent Number: 4,705,441
[45] Date of Patent: Nov. 10, 1987

[54] SELF LOCKING SHEET METAL SCREW

[75] Inventor: Larry J. Arnold, Statesville, N.C.

[73] Assignee: Arnold Technologies, Inc., Charlotte, N.C.

[21] Appl. No.: 828,487

[22] Filed: Feb. 12, 1986

[51] Int. Cl.⁴ ..................... F16B 39/282; F16B 35/04
[52] U.S. Cl. .................................. 411/188; 411/399; 411/413
[58] Field of Search ................ 411/180, 181, 184–188, 411/399, 386, 410, 412, 413, 415; 403/408.1

[56] References Cited

U.S. PATENT DOCUMENTS

| | | | |
|---|---|---|---|
| 2,112,494 | 3/1938 | Olson | 411/187 |
| 2,391,308 | 12/1945 | Hanneman | 411/134 |
| 3,682,507 | 8/1972 | Waud | 411/413 |
| 4,516,893 | 5/1985 | Barth | 411/399 |
| 4,518,294 | 5/1985 | Barth | 411/399 |

Primary Examiner—Neill Wilson
Attorney, Agent, or Firm—Ralph H. Dougherty

[57] ABSTRACT

A fastener for attaching sheet metal or articles to sheet metal. The fastener is a self-locking sheet metal screw having a plurality of equally spaced teeth formed within a recess beneath the fastener head during the heading operation. The teeth preferably have curved trailing edges and straight or slightly inclined leading edges, and each extends laterally a different distance from the shank, as well as vertically a different distance along the shank, such lateral and vertical distances on a single tooth being equal.

10 Claims, 7 Drawing Figures

SELF LOCKING SHEET METAL SCREW

BACKGROUND OF THE INVENTION

The present invention is a sheet metal screw. More particularly, the invention is a sheet metal screw for connecting thin layers of material, which screw will resist stripout more effectively than other known sheet metal screws. "Stripout" is the tendency of a screw to become loosened from the position into which it has been tightened by the application of torque in excess of the driving torque, to the point of failure of the clamping load, i.e., overtightening.

Barth U.S. Pat. No. 4,516,893 teaches a rotary fastener having a serrated helical ramp forged into the undersurface of the head. The ramp extends part way through the mating holes in two pieces of sheet metal being fastened together and allegedly engages the lower sheet. However, it is clear that the configured ramp will tend to move the screw from side to side during tightening, and can give a false indication of tightness as the screw is being installed. Barth, however, attains optimum strip-out torque uniformly as added torque is applied.

Other rotary fastener patents which may be of interest to the reader include: Loretan U.S. Pat. No. 3,258,047; Churla U.S. Pat. No. 3,761,867; Wagner U.S. Pat. No. 3,960,048; Wagner U.S. Pat. No. 4,238,165; and Temple, Jr., U.S. Pat. No. 4,295,767.

SUMMARY OF THE INVENTION

The invented screw includes a cylindrical shank, one end of which may be tapered or conical, and the other end of which carries a head having drive-inducing surfaces for engagement with a driving tool for rotating the screw about its longitudinal axis. A plurality of equally spaced teeth are formed beneath the screw head, each tooth preferably having a flat leading edge (i.e, leading during installation) and a curved trailing edge. The leading edges are preferably normal to the axis of the screw shank or slightly inclined. The teeth increase in dimension around the circumference of the shank. A tooth has the same horizontal and vertical dimension, but each tooth differs incrementally from the tooth adjacent to it.

OBJECTS OF THE INVENTION

It is the principal object of this invention to provide a fastener for sheet metal having extremely strong gripping means.

It is also an object of this invention to provide a fastener for sheet metal which has high resistance to "strip out".

It is also an object of this invention to provide a fastener for sheet metal which will cause a slight deformation of the sheet metal to increase the holding tendency of the fastener.

It is another object of this invention to provide a fastener suitable for very thin sheet metal.

It is also an object of this invention to provide a fastener for sheet metal having a positive locking action.

It is another object of this invention to provide a fastener equally suitable for use in metal buildings, heating and air conditioning ducts, appliances, metal furniture, hardware, and automotive applications.

BRIEF DESCRIPTION OF THE SEVERAL VIEWS OF THE DRAWINGS

The foregoing and other objects will become more readily apparent by referring to the following detailed description and the appended drawings in which.

DETAILED DESCRIPTION

Figure 1:
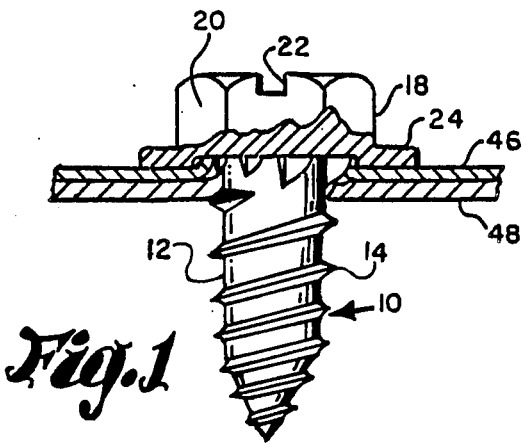
FIG. 1 is a partially cut-away, side elevational view of the invented screw engaging a pair of light gauge sheets of metal.
Figure 2:
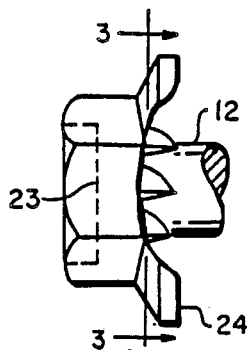
FIG. 2 is a partially cut-away, turned, side elevational view of the screw of FIG. 1, showing an alternative head, with a socket therein.
Figure 3:
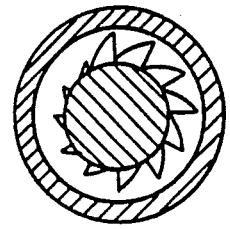
FIG. 3 is a sectional view of the screw of FIG. 2 taken along line 3—3 of FIG. 2, and showing the tooth arrangement beneath the screw head.

As shown in the drawings, and with particular reference to FIG. 1, screw 10 has a shank or body portion 12 which contains a thread 14 which extends from the end 16 remote from the head 18 to the end of the shank near the head 18. The head is adapted to being engaged by a tool for turning a screw. Hexagonal outer surfaces 20 are shown on the head for engagement by a wrench, as well as a slot 22 for a screwdriver. Alternatively, the head can have any desired configuration for engaging any style of installation tool, and may contain any desired recess, for instance recess 23 (FIG. 2) for engagement by a socket wrench, or a recess adapted to fit an Allen wrench, or a Phillips screw driver, or other drive tool, as desired.

Figure 4:
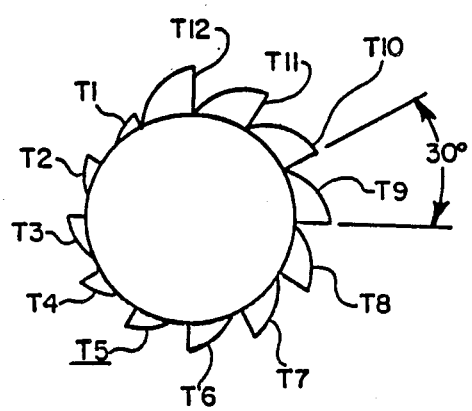
FIG. 4 is an enlarged view of the central portion of FIG. 3, showing the teeth more clearly.

The head 18 of screw 10 is surrounded by a peripheral flange 24, which forms a recess 26 in the underside of the head. Within the recess, I provide a plurality of equally spaced teeth T1, T2, T3, et seq. Twelve is the optimum number of teeth T. T1 indicates the shortest and smallest tooth. Each of the teeth T is incrementally longer than the tooth adjacent to it, except for the largest tooth T12 compared to T1, and each extends a different distance downwardly on the shank 12 and outwardly from the shank 12. The shortest tooth T1 extends only approximately ¼ the distance of the longest tooth T12, each succeeding tooth from tooth T1 being incrementally longer than the tooth next to it. As best shown in FIG. 4, the angle between the leading faces of adjacent teeth is 30°, however, this can vary by plus or minus 15° because of die design or die wear in the manufacture of the screw.

Figure 5:
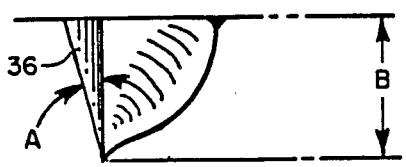
FIG. 5 is an enlarged elevational view of a single tooth.
Figure 7:
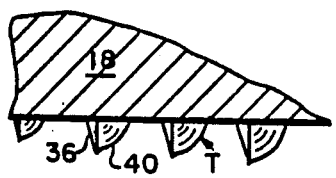
FIG. 7 is an enlarged view of a portion of FIG. 1, showing the teeth more clearly.

The leading edge 36 of each tooth (see FIG. 5) is straight or flat, and the trailing edge 40 of each tooth is curved or rounded. The angle A of the leading edge, as best shown in FIG. 5, can vary from plus or minus 15°, but is generally between 0° and 10°.

Figure 6:
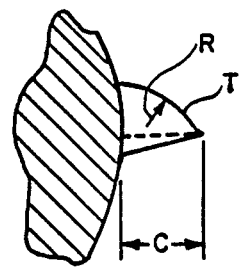
FIG. 6 is a partially cut-away, top view of the tooth of FIG. 5.

FIG. 6 shows the top of the tooth, a view that is in section, but no section lines are shown as they would obscure the details. Dimension B indicating tooth height (see FIG. 5) and dimension C representing the lateral distance the tooth extends outwardly from shank 12 (see FIG. 6) are equal, and R, the radius of the tooth T in FIG. 6 is from 0.50 to 0.75 times dimension C.

In operation, a hole is pierced, punched or drilled in light gauge or a thin layer of sheet metal 46, and the same size, but preferably a smaller size, hole is pierced, drilled or punched through light gauge sheet metal 48 to which sheet 46 is to be attached. Upon insertion and tightening of the screw 10, the edges of the hole move upwardly into the recess beneath head 18 and engage the teeth T1, T2, et seq. The flat leading edges 36 of the teeth engage the metal, creating a locking action or mechanism, which strongly resists what is known in the trade as "strip out". The rounded trailing edges 40 creates a firm mating surface, which resists both backout and vibration.

The invented screw is suitable for use either with preformed holes or as a self-piercing screw.

The invented screw can be provided with either a machine thread or a spaced thread, as illustrated, the latter being also known as a tapping screw thread.

In an alternative embodiment, the uppermost two thread turns can be spread or spaced more than the lower thread turns to inhibit strip out.

In another alternative embodiment, the uppermost two thread turns can have a larger outside dimension, which will also inhibit strip out.

SUMMARY OF THE ACHIEVEMENTS OF THE OBJECTS OF THE INVENTION

From the foregoing, it is readily apparent that I have invented a fastener for sheet metal having extremely strong gripping means, which has high resistance to "strip out", and which will cause a slight deformation of the sheet metal to increase the holding tendency of the fastener.

While there is shown and described present preferred embodiments of the invention, it is to be understood that the invention is not limited thereto or thereby, but any changes or modifications within the scope of the following claims are included within the invention.

What is claimed is:

1. A screw fastener comprising:
   a generally cylindrical shank;
   an enlarged head on one end of said shank, said head having drive tool engaging means;
   said shank having at least one helical thread thereon;
   said head having a lower annular peripheral flange concentric to the axis of said shank, said flange having a recessed portion beneath said head;
   a plurality of equi-angularly spaced teeth beneath said head and within said recess, each tooth being fixed to said head and to said shank, and each tooth having a tooth height equal to the lateral distance the tooth extends outwardly from said shank;
   each tooth having a leading flat face and a trailing curved surface; and
   each successive tooth, except the shortest tooth, extending incrementally further outwardly from said shank than an adjacent tooth.

2. A fastener according to claim 1 wherein each tooth extends outwardly a different distance from the central axis of the shank.

3. A fastener according to claim 1 wherein said flat face of each tooth varies from the perpendicular to the head plus or minus zero to 15 degrees.

4. A fastener according to claim 1 wherein the end of said shank opposite said head terminates in a point.

5. A fastener according to claim 1 wherein the end of said shank opposite said head is tapered.

6. A fastener according to claim 1 wherein the horizontal radius of each tooth is from 0.50 to 0.75 times the height of such tooth.

7. A fastener according to claim 1 wherein the thread on said shank is a machine thread.

8. A fastener according to claim 1 wherein the thread on said screw is a tapping screw thread.

9. A fastener according to claim 1 wherein the uppermost two thread turns are formed with greater space between them than the lower thread turns.

10. A fastener according to claim 1 wherein the uppermost two thread turns have a larger outside dimension than the lower thread turns.

* * * * *